Feb. 17, 1970 W. ACHERMANN ET AL 3,495,756
TRANSPORTATION AND STORAGE SAFEGUARD FOR HIGHLY
STRESSED ARTICLES MADE OF CORRUGATED OR PLAIN
CARDBOARD, PLASTIC FOAM AND THE LIKE
Filed Nov. 24, 1967

INVENTORS
WERNER ACHERMANN
FRANZ ACHERMANN

BY *Lowry & Rinehart*

ATTORNEYS

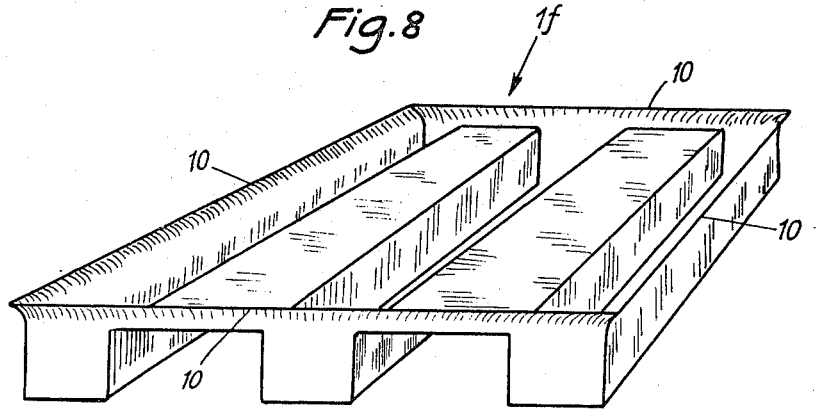
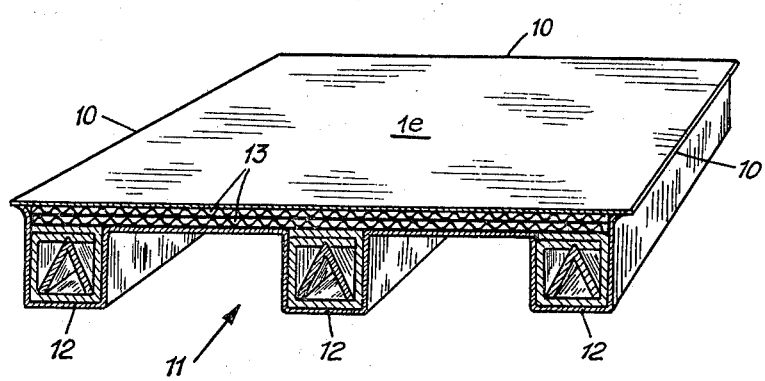

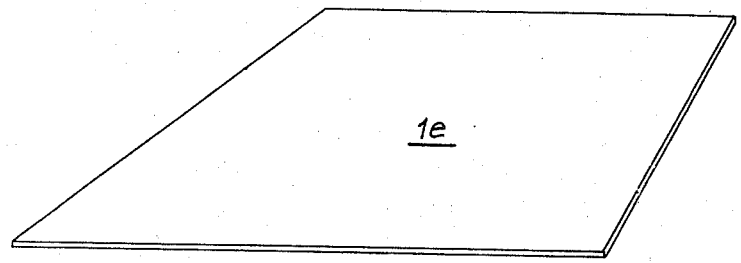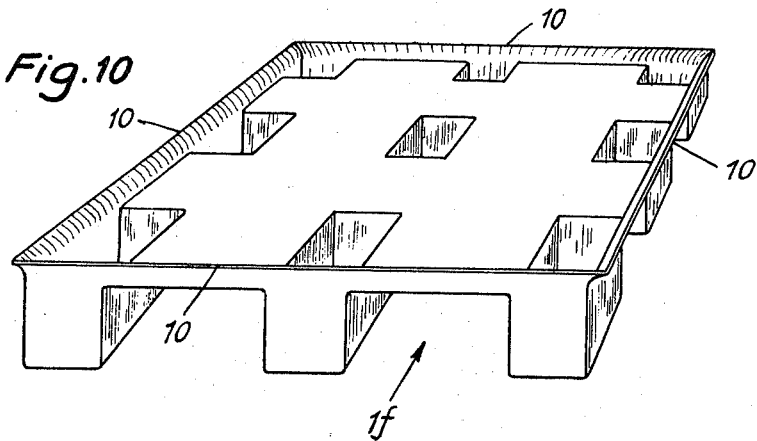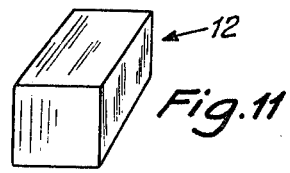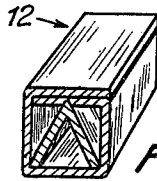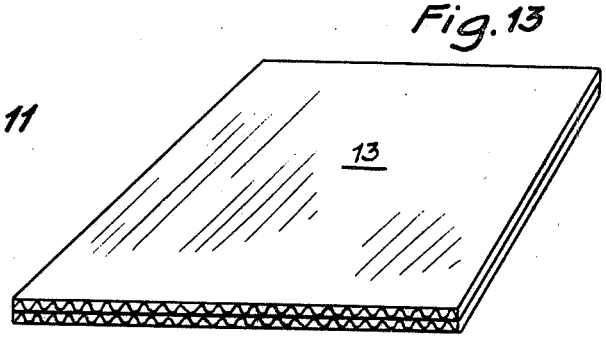

United States Patent Office 3,495,756
Patented Feb. 17, 1970

3,495,756
TRANSPORTATION AND STORAGE SAFEGUARD FOR HIGHLY STRESSED ARTICLES MADE OF CORRUGATED OR PLAIN CARDBOARD, PLASTIC FOAM AND THE LIKE
Werner Achermann and Franz Achermann, both of 71 Rumlangstrasse, 8052 Zurich, Switzerland
Filed Nov. 24, 1967, Ser. No. 685,634
Claims priority, application Switzerland, Nov. 28, 1966, 17,161/66
Int. Cl. B65d 5/56
U.S. Cl. 229—14
11 Claims

ABSTRACT OF THE DISCLOSURE

This disclosure provides a safeguard means for articles such as containers, pallets and structural elements which are subjected to many stresses during transportation and storage of goods. The safeguard means comprises a prefabricated casing which closely fits the contour of the packing article. The casing is constructed at least partially of a synthetic plastic material which is hard for durability and includes sufficient elasticity to provide a suitable fit between the casing and the packing article.

BACKGROUND OF THE INVENTION

In the industry of consumable goods in particular, most packing containers today are formed and constructed to be thrown away after use, since when empty they cannot be stacked or nested into each other and thus their return does not pay on account of their bulkiness. In order to lower the production costs, such containers as a rule are made of corrugated or plain cardboard, plastic foam and the like, of which the stiffness is just sufficient to withstand the mechanical stresses to be expected in transport, for example owing to improper handling (throwing, pushing) or to weather factors (atmospheric moisture, rain, snow) which might harm the goods in the containers.

PURPOSE OF THE INVENTION

It is an object of the present invention to provide a safeguard device which protects a packing article against extreme mechanical stresses such as shocks or impacts experienced during transportation of goods.

Another object of the invention is the provision of a safeguard device which protects a packing article against moisture arising from atmospheric conditions or from wet goods which are packed therein.

It is a further object of the invention to provide a safeguard device which is easily removable for sequential use with other packing articles once the packing articles being protected become useless and must be discarded.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 8 depicts a protective case for a two-way pallet in perspective, FIG. 9 shows in perspective and in vertical section a pallet made of corrugated cardboard embedded in the protective case with welded-in cover, FIG. 10 illustrates in perspective a protective case for a four-way pallet, FIG. 11 is a perspective view of a footing made of plastic for the pallet according to FIG. 10, FIG. 12 is a similar view of a footing made of corrugated cardboard, FIG. 13 shows in perspective two corrugated-cardboard blanks for the pallet of FIG. 10.

DESCRIPTION OF SPECIFIC EMBODIMENT

Figure 1:
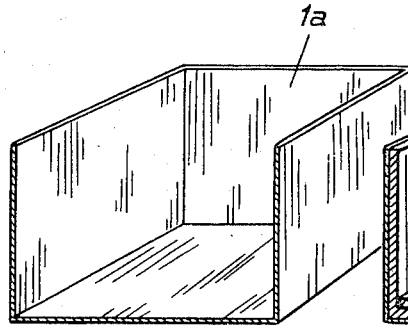
FIG. 1 depicts in perspective the most simple form of a protective casing for the outsides of a packing container that is open on one side.
Figure 2:
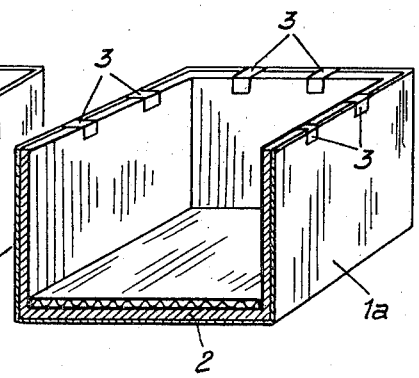
FIG. 2 is a perspective view of a packing container in vertical section, which container is provided with the protective casing according to FIG. 1.

The simplest form of safeguard shown in FIG. 1 comprises a casing 1a that is open on top and of which the shape is so fitted to the article to be protected that it snugly fits same. The thin casing 1a is prefabricated of hard but elastic plastic material which, as desired, may have other special properties yet. If, for example, the casing 1a shall mainly give protection against mechanical influences, then a specially tough, shock and scratchproof plastic is chosen. If, however, the article surrounded by casing 1a shall mainly be protected from water, then a plastic material is suitable which not only is waterproof but also will adsorb only very little water.

Into the casing 1a may be set the article to be protected, for example a packing container 2 made of cardboard, the casing 1a clinging to the container maintaining its form and shape and increasing the strength thereof. Casing 1a and packing container 2 may, if required, be interconnected in a simple way and manner by short sections of adhesive tape 3. A container embedded in such a casing is sufficiently protected from exterior influences such as blows, pressure, shocks or water. When in the course of time the container itself has become poor-looking or useless, it may be replaced by a new one, in which case the casing, however, may be used further.

In order that not too much space is required for storing a large number of casings, the latter suitably are formed so as to slightly taper away from the open side. In such a case they may be stacked or nested into each other.

Figure 3:
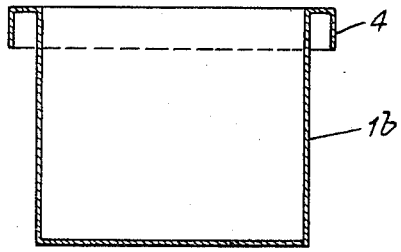
FIG. 3 shows in vertical section a protective casing for the insides of a packing container that is open on one side.
Figure 4:
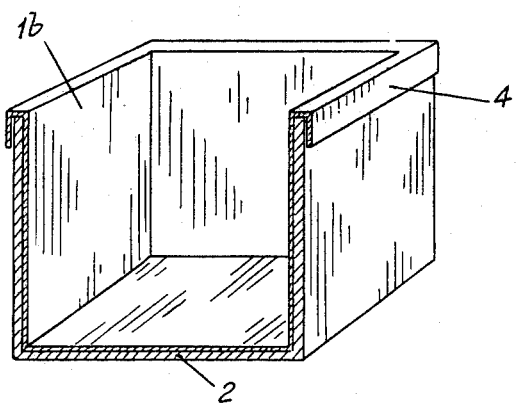
FIG. 4 illustrates in vertical section and in perspective a packing container that is provided with the protective casing according to FIG. 3.
Figure 5:
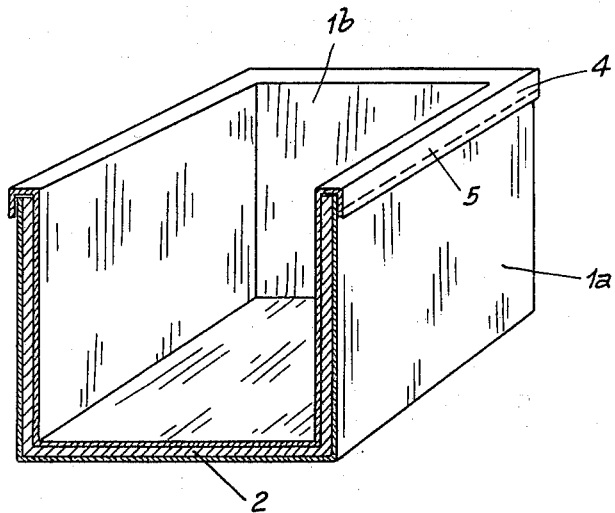
FIG. 5 shows in vertical section and in perspective a packing container that is provided both with a protective casing according to FIG. 1 and a protective casing according to FIG. 3.

Whilst the casing 1a shown in FIG. 1 protects the outside of a container, casing 1b shown in FIG. 3 is destined to protect the container insides. It comprises at its open end a collarlike brim 4 which, as shown in FIG. 3, on insertion into a packing container 2 made of cardboard is applied or engaged to the free rims thereof. Packing container 2 thus protected on the inside is now capable to take up wet goods such as meat, berries, fruit, dewfresh vegetable, even pastry substances and liquids without any risk, if the casings 1b is made of plastic impervious to water; owing to the cover afforded by brim 4 also the margins of container 2 are protected from dripping water.

In order to protect a packing container inside and outside, it may be provided with a casing as shown in FIG. 1 and, at the same time, with a casing as shown in FIG. 3.

In this way the packing container is on all sides enclosed by the casings 1a, 1b. The collar-like brim 4 of the inner casing 1b may be watertight connected to the outer casing by means of an adhesive tape; or if the two casings 1a, 1b are made of a thermoplastic material, a welding seam 5 may close the casings. Such a container may be used, for example, as a crate for cold-storage buildings, as watertank or together with a perforated cover, as container for transporting small animals.

Figure 6:
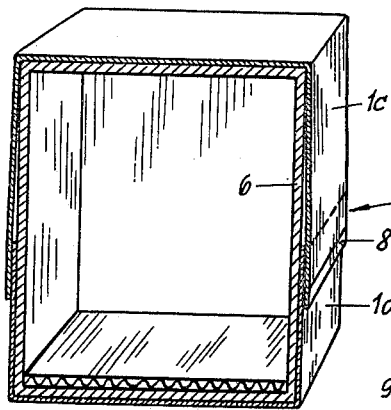
FIG. 6 is a vertical section through a closed packing container with a two-part protective casing.

FIG. 6 shows a packing container 6 made of cardboard which is enclosed by a two-piece casing 1c, 1d. Between the casing top piece 1c and the casing bottom piece 1d an overlap 7 of such extent is provided that a first weld 8 may be effected along the free rim of casing piece 1c; if such weld has to be broken, for example during a customs control, the remaining overlap 7 still offers sufficient space for applying a second or even third weld. Connection between the two casing pieces 1c and 1d by welding has the advantage over gumming (by means of adhesive tape) that any theft may be recognized at once at the damaged welding seam.

Figure 7:
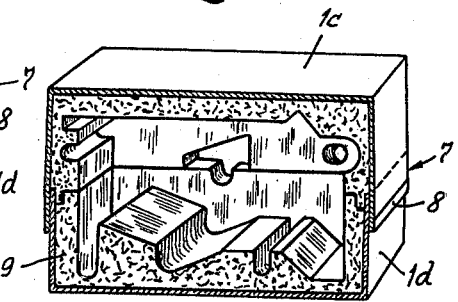
FIG. 7 is a similar illustration of a packing container made of plastic and of which the insides are fitted to the contours of the article to be packed.

In FIG. 7 is shown a packing container 9 made of plastic foam which comprises a two-piece casing 1c, 1d and of which the insides are fitted to the contours of the article to be packed. Since such articles mostly are highly sensitive precision parts or instruments, the casing—of which the two pieces 1c, 1d are interconnected by a welding seam 8—offers an effective protection against intrusion of dust and moisture into the packing container 9. When the requirements are less stringent or in the interest of a closure with more simple means, the casing pieces 1c, 1d may be interconnected by means of a watertight adhesive tape.

As shown in FIGS. 8 to 13, the use of the present safeguard is not only possible in packing containers but also in pallets. In FIG. 8 is shown a casing bottom part 1f for a two-way pallet; the free brims 10 stand off horizontally outwards so that they can be welded later on to the casing top part (not shown). Into this casing bottom part 1f is inserted a two-way pallet as shown in FIG. 9 which is made of corrugated cardboard. After setting down the platelike casing top part 1e (FIG. 10) the latter is welded to the bottom part 1f along the horizontal rims 10. In order to reduce the space required for storage, it is recommended not to insert a finished or complete pallet in the casing bottom part 1f but rather the single parts thereof, such as the footing (joists) 12 made of corrugated cardboard and one or more corrugated-cardboard blanks 13. These parts may be stacked or nested in much less space than entire pallets. The casing bottom pieces 1f can be readily stacked or nested by virtue of their slightly conical form, as mentioned before. By assembling the single parts in situ, the assembly costs in the manufacturer's shop may be saved and, furthermore, the shipping costs will be less on account of saving in space. In order to improve the coherence or unity, the footing elements 12 may be provided with a self-sticking layer and strippable protective foil on that side which later will be engaged with the lower corrugated-cardboard blank 13.

FIGS. 10 to 13 show the same principle of use in connection with a four-way pallet, accordingly the same reference numerals being used. As indicated in FIG. 11, the footing elements 12 which here are formed as little blocks, may be made of hard plastic foam.

Figure 14:
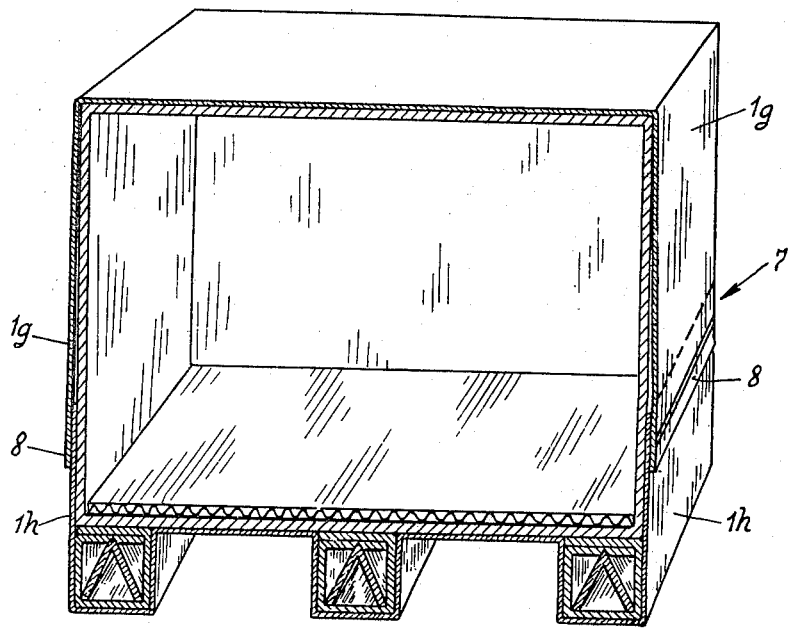
FIG. 14 shows in vertical section and in perspective a two-way box pallet provided with a two-piece protective case.

In FIG. 14 is shown the application of the same principle to a two-way box pallet. Here the casing bottom piece 1h has been drawn slightly up, and the casing top piece 1g extends so far downwards that an overlap 7 results which allows the application of a welding seam 8.

Application of the idea underlying the invention is, of course, not limited to the examples described and shown but may be extended, for example, to packing containers, in particular export cases, made of plywood, wood and compound materials, as well as to braces and stiffeners (pallets, structural or supporting elements) made of said materials.

The means described afford positive protection from mechanical influences and effects (for example blows, strokes, impact, sliding, slipping, scratching, grinding and dragging) against water, moisture and other influences of climate or weather (packing for tropical climate), against chemical influences (acidiferous vapors, saltwater and the like) and against intrusion of dust, dirt and sand. The airtight closure ensures a uniform moisture content of packing material and contents and prevents desiccation thereof. The stability of the interior packing and stiffeners (pallets, structural or bracing elements) is maintained on the entire transport. The interior packings reinforced and protected by the protective casing, may be made cheaper in price and lighter in weight.

In particular the combination of packing containers made of corrugated cardboard on one hand with protective means on the other hand results in a very favorable production cost and a very low weight, which is specially important in airfreight. The packing may be provided as throw-away packing, or may be used repeatedly as long as it remains intact. A further reduction of costs results from the fact that in most cases the use of steel-bands or other holding-down bands may be dispensed with. Through the particularly suitable and appropriate combination many wooden packing means may be saved, whereby transportation costs may be lowered down to 20 percent.

The protective means do not have to be made entirely of heat-deformable plastic, but it will suffice when they are made of such material in the range of their open rim, or when they have there at least a thermoplastic strip extending over the entire circumference.

The protective means which clings snugly to the outsides of the article to be packed, consists of such plastic and is so adapted as to issue an abutting pressure which is under a certain stress and acts in a stiffening sense. The protective means disclosed in the present invention thus renders the packed article not only impactproof and waterproof but at the same time improves the mechanical strength thereof owing to its stiffening effect without substantial increase in weight.

While the invention has been described in detail with respect to a now preferred example and embodiment of the invention it will be understood by those skilled in the art after understanding the invention, that various changes and modifications may be made without departing from the spirit and scope of the invention.

What we claim is:

1. A safeguard device for protecting packing articles which are subjected to extreme stresses during the transportation and storage of goods comprising:
    (a) a casing means which fits over the structure of the packing article and is at least partially constructed of a plastic material,
    (b) said casing means has one open side,
    (c) said plastic material has sufficient hardness to provide durability and strength to said packing article,
    (d) said plastic material has sufficient elasticity to closely fit the contour of said packing article to produce an abutting pressure therebetween.

2. A safeguard device as defined in claim 1 wherein: said casing means is slightly tapered away from said open end to facilitate the nesting of a plurality of said devices.

3. A safeguard device as defined in claim 1 wherein: the material located along the open side of said casing means consists of thermoplastic plastic.

4. A safeguard device as defined in claim 1 wherein: said casing means includes at least one heat sealable strip extending along the circumference of said open side.

5. A safeguard device as defined in claim 1 wherein:
said casing means includes a laterally extending brim portion along said open side thereof.

6. A safeguard device as defined in claim 1 wherein:
said casing means includes an outer portion which fits over the outside of said packing article.

7. A safeguard device as defined in claim 6 wherein:
said casing means includes an inner portion which fits over the inside of said packing article,
said inner and outer portions each include contacting surfaces.

8. A safeguard device as defined in claim 7 wherein:
said device includes means to connect said inner and outer portions at said contacting surfaces.

9. A safeguard device as defined in claim 7 wherein:
said contacting surfaces comprise overlapping sections located along the open sides of said inner and outer portions.

10. A safeguard device as defined in claim 6 wherein:
said outer portion constitutes a first outer portion which fits over a first section of said packing article and
said casing means includes a second outer portion which fits over second section of said packing article,
said first and second outer portions each include contacting surfaces and
said device includes means to connect said first and second outer portions along said contacting surfaces.

11. A safeguard device as defined in claim 10 wherein:
said contacting surfaces comprise overlapping sections located along the open sides of said first and second outer portions, and
said connecting means include heat sensitive material located along the open sides of said first and second outer portions to effect sealing along said contacting surfaces.

References Cited

UNITED STATES PATENTS

| | | | |
|---|---|---|---|
| 2,777,626 | 1/1957 | French | 220—63 XR |
| 2,939,606 | 6/1960 | Durbin | 220—63 |
| 3,055,568 | 9/1962 | Zalkind | 229—14 |
| 3,211,324 | 10/1965 | Sapien | 220—63 |
| 3,262,628 | 7/1966 | Heisler et al. | 229—14 |
| 3,307,693 | 3/1967 | Bittner | 206—78 |
| 3,318,445 | 5/1967 | Schner | 206—78 |
| 3,337,086 | 8/1967 | Jenks | 220—63 |
| 3,394,801 | 7/1968 | Hanson | 206—78 |

DAVIS T. MOORHEAD, Primary Examiner

U.S. Cl. X.R.

220—63; 206—78